3,242,131
PRODUCTION OF THERMOSETTING COATING POWDERS FROM FATTY GUANAMINES AND EPOXY RESINS
Dwight E. Peerman, Minneapolis, Minn., assignor to General Mills, Inc., a corporation of Delaware
No Drawing. Filed Feb. 23, 1962, Ser. No. 175,332
11 Claims. (Cl. 260—37)

The present invention relates to improvements in the production of thermosetting coating powders and to the process of using same. More particularly, this invention relates to improvements in the production of thermosetting coating powders and the process of coating articles therewith described and claimed in my copending application, Serial No. 175,331, now Patent No. 3,214,403, filed February 23, 1962.

Coatings on metallic articles are particularly desirable for protection from destructive solvents, chemicals or corrosive agents, or when it is desired that the surfaces be electrically insulated or resistant to mechanical abrasion or frictional wear. Of course, articles to be coated may also be of non-metallic materials such as glass, ceramics, wood, and the like. Dipping, brushing, spraying and extrusion are the classical methods of applying coatings. All of these methods have certain drawbacks, many of which can be overcome by the use of a fluidized bed. Generally, said process involves the application of a coating by heating the article to a temperature above the melting point of the coating material and then dipping it into the fluidized bed. Particles which strike the substrate surface fuse and adhere. Some of the advantages of this process over the classical methods include: ability to coat complex shapes, easy regulation of coating thickness, efficient use of coating material, high coating rate, simple and inexpensive process equipment, smooth continuous coatings, elimination of the need for solvents and ability to apply thick insulative coatings in one coat rather than multiple coats, on corners and edges as well as on flat and round surfaces.

A variety of coating materials have been used in the fluidized bed process. Thus thermoplastic resins or materials such as polyethylene, linear polyamides (nylons), polystyrenes, acrylic resins, bitumen such as gilsonite or asphalt, shellac and wax have been used. It is also set forth in the prior art that certain thermosetting epoxy resins can be used as the coating materials in the fluidized bed process. However, the epoxy resin powders available commercially are those comprising a blend of dry curing agent (such as dicyandiamide, aromatic diamines, aromatic anhydrides, and $BF_3$ complexes) and powdered epoxy resin. These blends have certain disadvantages inherent in physical mixtures. Thus the curing agents are present in an unreacted state which gives rise to corrosion problems in storage and shipment, a chance of loss of reactivity by uncontrolled reaction and potential toxicity. Furthermore, the physical blend of curing agent and epoxy resin has a tendency to classify during the coating operation or because of vibration during shipment. This tendency to classify is further aggravated when pigments, flow control and anti-caking agents and the like are used in addition to the curing agent and epoxy resin. Also liquid epoxy resins may not be used with the above described curing agents since the liquid resin, even if blended with a solid resin, would cause fusing or caking making it impossible to apply the coating material as a dry powder. Additionally, some of the physical blends are sensitive to oxygen and/or moisture and thus the gas used in the fluidized bed must be nitrogen or dry air.

In my copending application, referred to hereinabove, are disclosed thermosetting coating powders prepared from epoxy resins which have been partially reacted with certain guanamines. I found that said partially reacted or "B-staged" resin powders provided a homogeneous, single component, coating material which did not classify during the coating operation or because of vibration during shipment. Also, since the epoxy resin and guanamine curing agent are already tied up in partial reaction, the reactivity of the ingredients was found to be greatly limited. It was also discovered that dry, friable powders having unexpectedly low melting points could be prepared from mixtures of solid and liquid epoxy resins. Although these powders had melting points above room temperature, they were still low enough melting to coat items which had been preheated to a lower temperature than had been previously possible.

It was also discovered that pigments and flow control and anti-caking agents could be incorporated in the "B-staged" resin powders either prior to, during or after the "B-staging" of the epoxy resins and guanamines. The flow control and anti-caking agents were found to improve the powders by regulating the flow-out thereof on the article to be coated and by preventing caking of the powders when stored for any relatively long period of time. The synthetic amorphous silicas and natural silicates were found to be particularly useful flow control and anti-caking agents.

I have now discovered that coating powders having unusually good properties can be prepared from "B-staged" epoxy resin-fatty guanamine systems by adding flow control and anti-caking agents to the epoxy resin-fatty guanamine system both prior to or during and after the "B-staging" reaction. For convenience, the terms "internal" and "external" will be used, respectively, to describe flow control agents added before and after the "B-staging" reaction. Both additions are essential to the success of this invention. The powders are highly resistant to caking at elevated temperatures, have good flow-out on melting with heat, provide increased edge coverage and give smooth, glossy coatings. It has been found that this combination of good properties cannot be achieved by adding all the flow control and anti-caking agents either prior to or after B staging.

A wide variety of guanamines may be employed as curing agents in preparing the powders according to the present invention. They may be represented by the following formulae:

A) 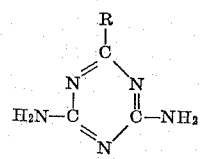

(B) 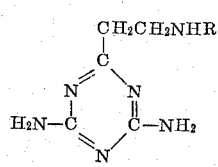

(C) 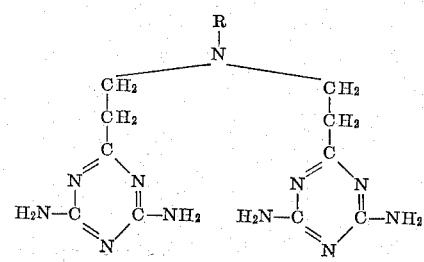

(D) 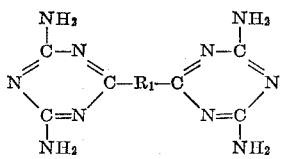

where R is an aliphatic hydrocarbon group containing from 4 to 21, preferably 6 to 21, carbon atoms and $R_1$ is the hydrocarbon group of dimerized unsaturated fatty acids.

The foregoing guanamine compounds may be defined generally by the following formula:

$$(A)_xB$$

where A is the ring

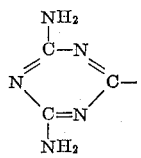

$x$ is an integer of 1 to 2 and B is selected from the group consisting of R, $RNHCH_2CH_2$—, $RN(CH_2CH_2$—$)_2$ and $R_1$ where R and $R_1$ have the meanings set forth above.

These guanamines are conveniently made from dicyandiamide and nitriles. Thus the aliphatic substituted guanamines may be prepared from aliphatic nitriles such as those derived from fatty acids. Compound B may be made from the nitrile, $RNHCH_2CH_2CN$, which is the acrylonitrile adduct with the fatty amine $RNH_2$. Compound C may be made from the acrylonitrile diadduct of the fatty amine $RNH_2$, $RN(CH_2CH_2CN)_2$. Compound D may be made from the dinitrile prepared from dimerized fatty acids such as linoleic acid. Thus, the fatty guanamines may be prepared from the higher fatty acids containing from 5 to 22 carbon atoms, or the polymerized derivatives thereof, by converting the fatty acids to the nitriles and then reacting the nitriles with dicyandiamide. The fatty acid employed may be a single, isolated fatty acid or may be the mixed fatty acids from a fat or oil or any selected fraction of such fatty acids. Moreover, the fatty acids may be either saturated or unsaturated. In addition, it is understood that the term "fatty" as used herein is not intended to exclude the branch chain products having the same number of carbon atoms. Fatty guanamines derived from the $C_8$ to $C_{18}$ acids of coconut oil are referred to as cocoguanamines.

Various methods of preparing the above described guanamines are known in the art. Thus, see the following U.S. patents: 2,447,175; 2,459,397; 2,606,904; 2,684,366; 2,777,848; 2,792,395; and 2,900,367.

Suitable epoxy resins for preparing the coating powders according to the present invention include the reaction products of polyhydric phenols with epichlorohydrin, or the like. Typical polyhydric phenols useful in the preparation of such resins include resorcinol and various bisphenols resulting from the condensation of phenol with aldehydes and ketones such as formaldehyde, acetaldehyde, acetone, methyl ethyl ketone and the like. A typical epoxy resin of this type is the reaction product of epichlorohydrin and 2,2-bis(p-hydroxyphenyl) propane (Bisphenol A), the resin having the following theoretical structural formula:

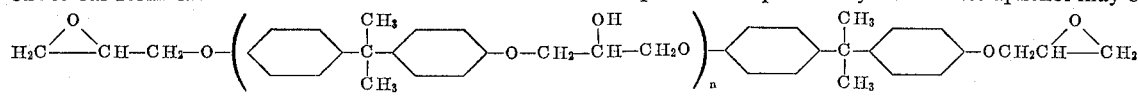

where $n$ is 0 or an integer up to 10. Generally speaking, $n$ will usually be no greater than 3 or 4, and may be 1 or less. However, other types of epoxy resins may be employed.

Another of such epoxy resins are those which are the reaction product of epichlorohydrin and bis(p-hydroxyphenyl) sulfone. Still another group of epoxy compounds which may be employed are the glycidyl esters of polymeric fat acids. These glycidyl esters are obtained by reacting the polymeric fat acids with polyfunctional halohydrins such as epichlorohydrins. In addition, the glycidyl esters are also commercially available epoxide materials. As the polymeric fat acids are composed largely of dimeric acids, the glycidyl esters thereof may be represented by the following theoretical, idealized formula:

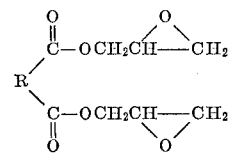

where R is the divalent hydrocarbon radical of dimerized unsaturated fatty acids. Glycidyl esters of other polybasic acids, such as phthalic and sebacic acids, may also be employed.

The polymeric fat acids are well known materials, commercially available, which are the products prepared from the polymerization of unsaturated fatty acids to provide a mixture of dibasic and higher polymeric fat acids. The polymeric fat acids are those resulting from the polymerization of the drying or semi-drying oils or the free acids or the simple aliphatic alcohol esters of such acids. Suitable drying or semi-drying oils include soybean, linseed, tung, perilla, oiticica, cottonseed, corn, sunflower, safflower, dehydrated castor oil and the like. The term "polymeric fat acids," as used herein and as understood in the art, is intended to include the polymerized mixture of acids which usually contain a predominant portion of dimer acids, a small quantity of trimer and higher polymeric fat acids and some residual monomers.

In general, the most readily available naturally occurring polyunsaturated acid available in large quantities is linoleic. Accordingly, it should be appreciated that polymeric fat acids will as a practical matter result from fatty acid mixtures that contain a preponderance of linoleic acid and will thus generally be composed largely of dimerized linoleic acid. However, polymerized fatty acids may be prepared from the naturally occurring fatty acids having from 5 to 22 carbon atoms. Illustrative thereof are oleic, linolenic, palmitoleic and the like.

Other types of epoxy resins which may be used to prepare the coating powders according to the present invention and which are commercially available epoxy materials are the polyglycidyl ethers of tetraphenols which have two hydroxy aryl groups at each end of an aliphatic chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha,alpha, omega,omega-tetrakis(hydroxyphenyl) alkanes, such as 1,1,2,2-tetrakis(hydroxyphenyl) ethane, 1,1,4,4-tetrakis(hydroxyphenyl) butane, 1,1,4,4-tetrakis(hydroxyphenyl)-2-ethylbutane and the like. The epoxy resin reaction product of epichlorohydrin and tetraphenol may be represented by the following theoretical structural formula:

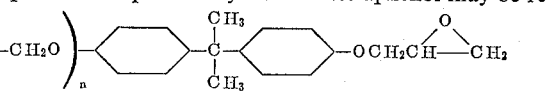
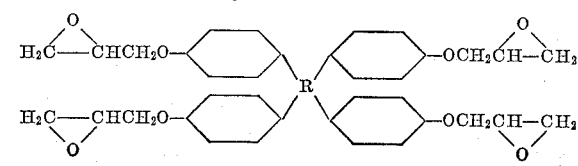

where R is a tetravalent aliphatic hydrocarbon chain having from 2 to 10, and preferably, from 2 to 6 carbon atoms.

Still another group of epoxide materials are the epoxidized novolac resins. Such resins are well known substances readily available commercially. The resins may be represented by the following theoretical, idealized formula:

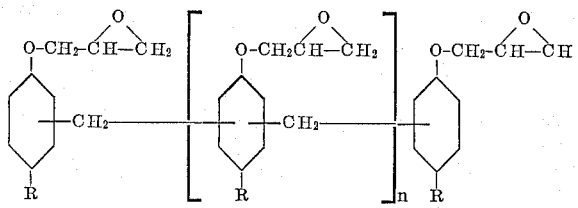

where R is selected from the group consisting of hydrogen and alkyl groups having up to 18 carbon atoms, and $n$ is an integer of from 1 to 10. In general, $n$ will be an integer in excess of 1 to about 5.

In general, these resins are obtained by epoxidation of the well-known novolac resins. The novolac resins, as is known in the art, are produced by condensing the phenol with an aldehyde in the presence of an acid catalyst. Although novolac resins from other aldehydes such as, for example, acetaldehyde, chloral, butyraldehyde, furfural, and the like may also be used. The alkyl group, if present, may have a straight or branched chain. Illustrative of the alkylphenol from which the novolac resins may be derived are cresol, butylphenol, tertiary butylphenol, tertiary amylphenol, hexylphenol, 2-ethylhexylphenol, nonylphenol, decylphenol, dodecylphenol and the like. It is generally preferred but not essential, that the alkyl substituent be linked to the para-carbon atom of the parent phenolic nucleus. However, novolac resins in which the alkyl group is in the ortho position have been prepared.

The epoxidized novolac resin is formed in the well-known manner by adding the novolac resins to the epichlorohydrin and then adding an alkali metal hydroxide to the mixture so as to effect the desired condensation reaction.

In addition, other epoxy resins which may be used to prepare the coating powders according to the present invention are epoxidized olefins, such as epoxidized polybutadiene and epoxidized cyclohexenes, and the diglycidyl ethers of the polyalkylene glycols. These latter ethers are readily available commercially and may be represented by the following theoretical, idealized formula:

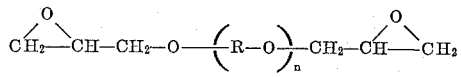

where R is an alkylene radical having from 2-5 carbon atoms and $n$ is an integer of from about 1 to about 50. R is preferably ethylene or propylene or mixtures thereof and $n$ is preferably about 3 to about 10. It is understood that $n$ represents an average figure since the ethers are often prepared from a mixture of glycols—i.e. tripropylene glycol, tetrapropylene glycol and the like. Said epoxy resins may be prepared in the manner set forth in U.S. Patent 2,923,696.

In general, the epoxy resins may be described as those having terminal epoxide groups.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy equivalent to one epoxy group or one gram equivalent of epoxide. The epoxy resinous materials employed in this invention have epoxy equivalent weights of from about 140 to about 2000.

While all of the above described fatty guanamines and epoxy resins are suitable for the preparation of the fluidized bed coating powders according to the present invention, it is preferred to use the monoalkyl fatty guanamines having the Formula A and the epoxy resins prepared from epichlorohydrin and polyhydric phenols such as Bisphenol A and the tetraphenols. Additionally, mixtures of epoxies of the same or different types may be used. It is understood that the properties of the coating powders will vary somewhat depending upon the particular epoxy resin and fatty guanamine used. For example, powders prepared from fatty guanamines of the Formula A and the epoxy novolacs have high heat resistance while those prepared from said guanamines and the diglycidyl ethers of polyalkylene glycols have good flexibility. And by using an epoxy prepared from epichlorohydrin and Bisphenol A in combination with either of the latter described epoxies, a powder can be prepared which has the basic properties of the Bisphenol A type epoxy but which will provide coatings having improved heat resistance and/or flexibility.

The fatty guanamine is used in an amount sufficient to cure the epoxy resin to an insoluble and infusible polymer. Generally, said guanamines are used in ratios by weight curing agent to epoxy resin of from about 5:95 to 75:25 and preferably from about 10:90 to 25:75. It is particularly preferred to use a ratio of 15:85.

Any of a wide variety of flow control and anti-caking agents can be used to prepare the powders according to the present invention. Examples of such agents include amorphous silicas, dehydrated silica gels, various natural silicates such as attapulgite and kaolin clays, amorphous alumina, talc and finely divided calcium carbonate. It is preferred to use amorphous silicas such as the commercially available Santocel "C," Cab-O-Sil "M-5" and Syloid "72." Outstanding results are obtained with Syloid "72" as will be clearly evident from the examples. The described agents are used in an amount sufficient to improve the flow-out of the powder on melting with heat and to prevent fusing or caking of the powder at high ambient temperatures, i.e. 125° F. Obviously the amounts of said agents will vary considerably depending on the particular agent used and the result desired. Generally, said agents will be used in amounts of about 2 to 50% by weight based on the weight of the epoxy resin and the fatty guanamines. The amorphous silicas are preferably used in amounts of about 2 to 15% by weight. Larger amounts of the clays are preferred, such as about 30 to 50% by weight.

The coating powders produced according to the present invention may also contain colorants, pigments or fillers. Said agents must be heat resistant since the fluidized powders are fused and cured at elevated temperatures of from about 200 to 400° F. Examples of suitable pigments include titanium dioxide (white finish), lead chromate (yellow), light and medium chrome yellow, chromium oxide (green), ultramarine blue, red iron oxide and toluidine red. The amounts of said pigments can be varied widely to give different shades of different colors. Additionally mixtures of different pigments may be used. Generally, said pigments are used in amount of about 1 to 15% by weight based on the weight of the epoxy resin and fatty guanamines. The preferred amounts of the various pigments are as follows: 10% of the yellows; 10-12% of chromium oxide; 10% titanium dioxide; 8% red iron oxide and 3% toluidine red. It is to be understood that any heat resistant pigment or colorant can be used and that the type thereof will vary with the color desired.

By "B-stage" resin is meant a partially reacted product which will undergo little or no physical change during extended storage at ambient room temperatures and in which the reactants are homogeneously compatible in a one component, stable compound ready for final curing at elevated temperatures.

A "B-stage" resin can generally be described as a partially reacted composition which is stable for extended period of time but is capable of being quickly cured at elevated temperatures. The epoxy-fatty guanamine compositions may be described as proceeding through three stages, A, B and C.

The "A stage" is a simple blend or mixture of the epoxy resin and guanamine in which essentially no reaction has taken place. Such a simple blend or mixture will be stable for great lengths of time but may or may not be homogeneous. The "B stage" is the same resin composition which has been partially reacted or cured and is quite stable for extended period of time. The "B stage" resin can be further reacted at elevated temperatures to yield the finally cured stage, the "C stage," which is an infusible and insoluble polymer.

The "A stage" mixture may, of course, be cured at elevated temperatures to provide an infusible, insoluble polymer. However, longer times for curing are required and the physical blend of epoxy resin and guanamine curing agent has a tendency to classify during the coating operation and shipment. The use of the "B stage" resin allows for rapid curing and still provides a stable starting material which does not classify and in which the reactants are already tied up in partial reaction.

The "B stage" epoxy resin-fatty guanamine coating powders produced according to my invention are prepared by heating a mixture of the epoxy resin and the guanamine in the presence of a portion of the flow control and anti-caking agent to effect partial reaction and stopping such reaction before the "C stage" is reached. This partial reaction can be effected at various temperatures. At higher temperatures, the time of heating becomes short for producing the "B stage" resin and care must be taken that the time is not sufficiently extended so as to result in the "C stage." At lower temperatures, the heating period is slightly longer and more control can be exercised. As a practical matter, the epoxy resin-guanamine system will generally be "B staged" at temperatures in the range of 100 to 210° C. Temperatures outside this range may be used, however, although such may present some problems. For example, at temperatures above 210° C. the time of heating is so short that it is difficult to prevent advancement of the cure to the "C stage" or fully cured state. At temperatures below 100° C. the time of heating is so prolonged as to be impractical or uneconomical. A common temperature used in practice is about 150° C., at which temperature the heating period is sufficiently long to allow for control over the reaction and yet is not an impractical or uneconomical length of time.

As the temperature and period of heating will vary somewhat dependent on the particular epoxy resin, the particular guanamine and the proportions thereof, some means of indicating when the "B stage" resin is reached had to be devised. It is, of course, most important that the reaction not be carried out to the point where gellation occurs. One means of preventing gellation, which can be used during the heating period, is the observance of the viscosity of the product. Another is to determine the oxirane oxygen content periodically and observe the rate of change thereof.

In observing the viscosity during heating, it will be noted that very little change occurs during the initial heating period. As heating is continued, that rate of change in viscosity begins to increase somewhat and just prior to gellation the rate increases very rapidly. When this rate increases greatly, the heating must be stopped quickly and the product cooled for gellation would occur in a brief time, a few minutes. The viscosity may be observed during the course of the reaction or first conducted on a small scale to obtain some indication of the approximate time of heating.

In the oxirane oxygen test, samples are withdrawn periodically and the oxirane oxygen content determined by titration with HBr in acetic acid. Since HBr titrates both the oxirane oxygen of the epoxy resin and amine of the guanamine, a value is obtained representing the total of these two. The amine contribution remains constant since primary amines continue to titrate even after reaction with oxirane oxygen. Thus, any decrease in titration results may be attributed to the disappearance of oxirane oxygen. Again the rate of change of oxirane oxygen content is low at first, begins to increase somewhat as the reaction proceeds and then increases quite rapidly. As the rate becomes rapid, the gellation point is close at hand and the reaction is stopped.

Thus the "B stage" resins may be prepared by heating the mixture of components at a temperature sufficient to effect partial reaction, for example at about 100 to 210° C., and preferably at 140 to 170° C. Thereafter the heating should be stopped and the reaction mixture should be cooled before final curing occurs so that a partially cured resin results. The termination point may be determined by observation of the viscosity and oxirane oxygen content. In general, a "B stage" resin is obtained when the reaction is from about 5 to 90% complete based on the disappearance of oxirane oxygen. As a practical matter the preferred "B stage" resins are those in which the reaction is about 15 to 50% complete, the most desirable being about 25 to 40% complete.

As indicated above a portion of the flow control and anti-caking agent is added prior to or during the "B-staging" reaction with the rest being added after said reaction. That portion added prior to or during the "B-staging" is thoroughly wet by the resin in the molten state. The resulting "B-stage" resin containing the internal anti-caking and flow control agent is cooled and reduced in size by milling, such as with a Wiley mill. It can be further reduced in size by being passed through a pulverizer, such as a Micro-Pulverizer. The rest of the flow control and anti-caking agent is then blended into the pulverized "B stage" resin by milling or other suitable means. A Simpson mix-muller can be used for this operation. As is obvious from the description hereinabove, the total amount of flow control and anti-caking agent can vary over a relatively wide range. It is preferred to add from about 30 to 95% of the total amount of said agent prior to or during the "B staging" reaction and from about 70 to 5% after said reaction. Exceptionally good results are obtained by adding about 65 to 95% prior to or during the "B-staging" and from about 35 to 5% after said reaction.

The colorants and pigments can be added prior to, during or after the "B-staging" reaction. However, it is preferred to add said agents after the said reaction by blending them with the resin by any suitable means such as milling. They can be added or blended with the resin at the same time and by the same method as the second or external portion of the flow control and anti-caking agent.

In order to obtain smooth, glossy coatings of even film thickness, the coating powders should be pulverized or ground to a relatively uniform particle size. Thus if the powders contain large amounts of fines or coarse particles, the coatings prepared therefrom will not be uniform thickness. It has been found that good results are obtained when the powders of the present invention have the largest percentage of particles in the size range of 50–200 microns. Powders having a particle size range of 75–150 microns are especially preferred.

The coating powders are preferably applied to the articles to be coated by the use of a fluidized bed. A fluidized bed is a mass of solid particles which exhibits the liquid-like characteristics of mobility, hydrostatic pressure, and an observable upper free surface or boundary zone across which a marked change in concentration of particles occurs. Alternatively, the fluidized bed may be termed a "dense phase" having an upper free surface. These definitions are found in an article entitled "Fluidization Nomenclature and Symbols" appearing at pages 1249 and 1250 in "Industrial and Engineering Chemistry," volume 41, number 6, June 1949. It is formed by introducing an ascending current of gas into the coating material under pressure, the bed being maintained in the fluidized state by controlling the flow of gas. An article to be coated is ordinarily heated and then immersed, at least partially, into the fluidized bed of the coating material. Individual particles of the coating material adhere and melt, thus fusing together with other particles on the hot surface of the immersed portion of the article to form a continuous coating thereon.

Any suitable apparatus may be used to fluidize the epoxy-fatty guanamine coating powders. One such apparatus is the "Vibro-Fluidizer," manufactured by Armstrong Resins, Inc., of Warsaw, Indiana. Another is that described in U.S. Patent 2,844,489.

Any gas which is reasonably inert at the temperatures and with the materials employed may be used as the gaseous medium for fluidizing the coating powders of the invention. Air is the preferred gas for reasons of economy (the "B-stage" coating powders of this invention are not sensitive to either oxygen or moisture). However, other gases, such as nitrogen, may be used. The pressure of the gas may vary greatly, depending on the particular shape and dimensions of the treating tank as well as on the particular coating powder used. The gas is preferably maintained at ambient temperatures. Higher or lower temperatures can be used, however, if desired.

The heating of the article should be to a temperature above the melting point of the coating powder. By "melting point" is here meant that stage wherein the powder is sufficiently coalesced to provide a continuous coating of the article. Temperatures as low as 95° C. can be used with some of the coating powders of the invention. There is no definite upper limit although the articles should not be heated so high as to cause degradation of the coating material or excessive run-off. Prior to the preheating, the surface of the article may be roughened, cleaned and/or degreased to obtain better adhesion of the coating to the article.

The period of immersion of the article in the fluidized bed may vary within relatively wide limits depending upon the thickness of the coating desired, the size and heat capacity of the article to be coated, the temperature to which the article is preheated, and the particular coating powder used. The time of immersion may thus vary from a fraction of a second up to a minute or more. Generally the time of immersion is about 1 to 15 seconds with the preferred time being about 3 to 10 seconds.

After the above described preheating and immersion, the article is removed from the fluidized bed and placed in an oven to complete the cure of the thermosetting coating thereon. Again the cure time and temperature may vary over wide limits. At higher temperatures the coating will be cured in a lesser amount of time. Generally, the article will be kept in the oven at a temperature and for a sufficient length of time to produce an infusible, insoluble coating thereon. Oven temperatures of from about 100° to 400° C. and higher may be used and the curing period may vary from a few minutes to several hours.

Instead of heating the article prior to immersion in the fluidized bed, other means can be employed to cause the powder to adhere to the articles. One such method is to precoat the article with a primer such as cyclohexanol or a sticky resin. Upon immersion in the fluidized bed, the "B-staged" resin particles strike the primed surface of the article and adhere. Subsequent curing in an oven will vaporize primers such as cyclohexanol leaving a primer-free coating of the cured epoxy resin. Another such method is electrostatic deposition. In this case the article to be coated is given an electrical charge which causes the resin particles to adhere to the surface of the article. The charge is maintained until the coated article is placed in the curing oven and the particles fuse. It may be advantageous to use the above procedures where the articles cannot be pre-heated to high temperatures. However, in such instances, the "B-staged" epoxy resin-fatty guanamine powder would have to have a fairly low cure temperature. Said procedures have certain disadvantages. Thus, when a primer is used, it may not be removed completely upon subsequent ovencuring of the coating and, therefore, the coating may not be as good as when no primer is used. Also, the above methods require additional materials and/or apparatus. Therefore it is preferred to preheat the article prior to immersion in the fluidized bed.

This invention is not limited to the application of the "B-staged" powder by the use of a fluidized bed. Thus, in certain cases such as when the articles are too bulky to be immersed in the fluidized bed or when it is desired to coat materials which are part of a permanent structure such as bridges, buildings and the like, the powder may be applied in the form of a fine spray or dispersion in any gaseous medium. Air is entirely suitable as the gaseous medium since, as indicated hereinabove, the "B-stage" coating powders of this invention are not sensitive to either oxygen or moisture. The powder can be atomized or dispersed in the gaseous medium by the use of any apparatus or method adapted for such purpose. A particularly suitable apparatus is a flocking gun which is commercially available. One such apparatus is a "model 171" flocking gun available from Binks Manufacturing Co., Chicago, Illinois. When using the above apparatus and method, the articles (including structures) to be coated, can be preheated, primed, subjected to an electrostatic charge or the like and then sprayed with the powder. After a sufficient amount of the powder has adhered to the articles, the spraying is stopped and the article is subjected to a heat treatment to cure the coating. The heat for the curing may be supplied by a heat lamp or lamps for example. While the above procedure can be used to coat articles of any size or shape, its main value lies in coating bulky articles or materials comprising parts of permanent structures. It is preferred to coat smaller articles in the fluidized bed since it is easier to obtain uniform coatings and the curing thereof can be carried out in the ovens.

The following reactants were used in the preparation of the coating powders of the examples which follow, said examples serving to further illustrate the invention:

*Epoxy Resin A.*—A condensation product of Bisphenol A and epichlorohydrin having an epoxy equivalent weight of about 190.

*Epoxy Resin B.*—A condensation product of Bisphenol A and epichlorohydrin having an epoxy equivalent weight of about 925.

*Guanamine A.*—A cocoguanamine of the general Formula A set forth hereinabove wherein R is a $C_{11}$ alkyl group. Said guanamine was prepared from dicyandiamide and a $C_{12}$ nitrile, the latter being derived from the $C_{12}$ fraction of coconut oil acids.

In the examples to follow, all parts are by weight, unless otherwise indicated. Also, the apparatus used to fluidize the powders in all of the examples was a "Vibro-Fluidizer."

EXAMPLE I

To a blend of 44.2 parts of Epoxy Resin A and 44.2 parts of Epoxy Resin B was added 11.5 parts of Guanamine A and 4.0 parts of Syloid "72." Syloid "72" is a commercially available amorphous silica manufactured by Davison Chemical Company (Division of W. R. Grace and Co.) having the following properties:

Silica (as $SiO_2$) _____ 98% min.
pH _____ 6–8.
Particle size _____ 3–5 microns in diameter.
Bulk density _____ 8.9 lbs./cu. ft.

The resulting blend was "B-staged" at 150° C. for 27 minutes at the end of which period the reaction product had a viscosity of 3,600 centipoises at 150° C. Upon cooling, the product was found to have a melting point of 73° C. and an oxirane oxygen content of 3.15% (corrected for silica content). The solid resin was pulverized so that a majority of the particles were in the size range of 75–150 microns.

EXAMPLES II–IV

The powders of these examples were prepared with the same materials and by the same procedure as the powder of Example I. However, in Example II, 4 parts of Syloid "72" were added prior to the "B-staging" and 4 parts were added after said resolution. In Example III, 4 parts were added prior to and 5 parts after said reaction. In Example IV, no Syloid "72" was added prior to the reaction and 7 parts after the reaction. The silica which was added after the "B-staging" was milled into the pulverized resin.

The powders of Examples I–IV were then used to coat steel probes which were 4 inches long and had a cross section 7/16 inch square with sharp corners. The probes were preheated to 150° C. and then immersed in the dense phase of the fluidized coating powders for about 5 seconds. The probes were removed from the bed and cured in an oven at 150° C. for 90 minutes. The flow of the powders on the pre-heated probes and the coating smoothness of the coatings are set forth in the following Table I. Caking resistance at 50° C. was also tested.

*Table 1*

| Exp. | Parts Internal Syloid "72" | Parts External Syloid "72" | Coating Smoothness[1] | Flow[2] | Caking Resistance[3] |
|---|---|---|---|---|---|
| I | 4 | 0 | V. smooth | Run-off | Caked. |
| II | 4 | 4 | do | Good | Passed. |
| III | 4 | 5 | Smooth | do | Do. |
| IV | 0 | 7 | V. smooth | do | Sl. caking. |

[1] Coating smoothness was rated as follows:
*Very Smooth.*—Glossy, no waves or unfused resin particles.
*Smooth.*—Coating is smooth but has small waves or a few unfused resin particles.
*Rough.*—Coating contains many unfused particles and/or is heavily waved.
*Very Rough.*—Coating covered with unfused particles and/or with pronounced waviness.
Coatings rated very smooth or smooth are satisfactory while those rated rough or very rough are not satisfactory.
[2] Flow was rated as follows:
*Run-off.*—Coating flows so much that material drips off the probe.
*Sag.*—Coating is thicker on the bottom of the probe than on the top.
*Incomplete Fusion.*—Powder does not form continuous film at 150° C.

The data of the above table show that the powders produced according to the present invention (Examples II and III) are satisfactory in all respects—i.e. they pass all three tests.

As indicated hereinabove, the coating powders may also contain heat resistant colorants and pigments. This is shown by the following examples.

EXAMPLES V–XII

The powders of these examples were prepared with the same materials and by the same procedures as the powders of Examples I–IV. However, the amount of Syloid "72" added prior to and after the "B-staging" reaction was varied. Also various pigments were milled into the cooled and pulverized "B-stage" resins. The amounts of internal and external silica, the particular pigments and amount thereof, coating smoothness, flow of the powders on the pre-heated probes, caking resistance of the powders and percentage edge coverage are set forth in Table II. The probes were of the same type and were preheated, dipped and cured in the same way as those of Examples I–IV.

*Table II*

| Example | Parts Internal Syloid "72" | Parts External Syloid "72" | Pigment | Coating Smoothness[1] | Flow[1] | Caking Resistance[1] | Percentage Edge Coverage[2] |
|---|---|---|---|---|---|---|---|
| V | 6 | 0 | 5 parts light chrome yellow, 10 parts TiO$_2$. | V. smooth | Run-off | Caked | <2 |
| VI | 8 | 0 | 7.5 parts light chrome yellow, 7.5 parts TiO$_2$. | do | Sag | do | <2 |
| VII | 8 | 3 | do | Smooth | Good | Passed | 25 |
| VIII | 8 | 3 | 5 parts ultramarine blue, 10 parts TiO$_2$ | do | do | do | 34 |
| IX | 8 | 3 | 5 parts chromium oxide, 10 parts TiO$_2$ | do | do | do | 30 |
| X | 10 | 0 | 5 parts light chrome yellow, 10 parts TiO$_2$. | V. smooth | do | Caked | 8 |
| XI | 10 | 1 | do | Smooth | do | Passed | 33 |
| XII | 10 | 2 | do | do | do | do | 39 |

[1] See Table I for the description of the above tests and ratings.
[2] Percentage edge coverage of the cured coating is calculated as follows:

Percent E.C. $= \dfrac{D_1 - D_2}{T_1 - T_2} \times 100$, where $D_1$ = thickness on diagonal after coating.
$D_2$ = thickness on diagonal before coating.
$T_1$ = thickness on flat after coating.
$T_2$ = thickness on flat before coating.
Measurements are made with a micrometer to the nearest 1 mil measuring double film thickness (opposite sides). Below about 25% is considered poor, 25–50% satisfactory and >50% excellent.

The data of Table II further show the outstanding results obtained by adding portions of the flow control and anti-caking agent both prior to and after the "B-staging" reaction. Thus the powders of Examples VII, VIII, IX, XI and XII not only pass the caking resistance test, have good flow characteristics, and provide smooth coatings, but they also give coatings having satisfactory edge coverage. The data also show that pigments can be added to the powders without any deleterious effects.

The fluidized bed coating powders produced according to the present invention may be used to coat a wide variety of plain, irregular and complex shaped articles made from various materials. Such articles may include, for instances, electrical insulators, bolts, pins, metal sheets, tubular sleeves, pipes, hooks, sieves, screens, gears, switches, bellows and innumerable other articles of greater or lesser complexity of shape. The articles may be made of various metals such as steel, iron, aluminum, copper,

*Good.*—Coating is well fused and uniform to ±1 mil top to bottom.
Ratings of run-off, sag or incomplete fusion are unsatisfactory while a rating of good is satisfactory.
[3] Caking resistance is measured by placing a 50 g. sample of the coating powder in a 4 oz. sample bottle which is then held at 50°±1° C. for 16 hours. The powder is then judged as follows:
*Passed.*—Powder flows freely on inversion of bottle with gentle tapping.
*Slight Caking.*—Powder retains soft lumps after above treatment.
*Caked.*—Powder does not flow at all after above treatment.
*Fused.*—Powder is partially melted, has shrunk away from the sides of the bottle and become a hard mass.

zinc and the like, as well as of alloys of said metals. Articles made from non-metallic materials such as glass, plastics, ceramics and the like may also be coated with the powders.

It is to be understood that the invention is not to be limited to the exact details of operation or the exact compositions shown or described, as obvious modifications and equivalents will be apparent to those skilled in the art and the invention is to be limited only by the scope of the appended claims.

The embodiments of the invention in which an exclusive property or privilege is claimed are defined as follows:

1. A process of preparing a thermosetting coating powder from (1) at least one epoxy resin having terminal epoxide groups and an epoxy equivalent weight of from about 140 to 2000, (2) an amount of a fatty guanamine sufficient to cure the said epoxy resin to an infusible and insoluble polymer, said fatty guanamine being selected from the group consisting of (A) 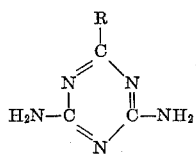

(B) 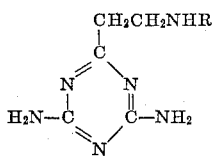

(C) 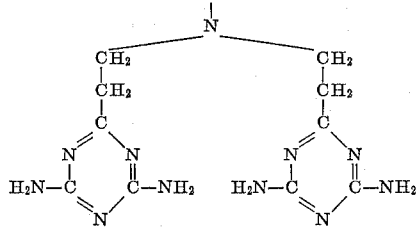

and (D) 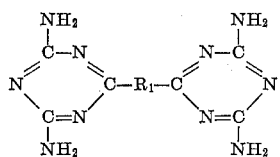

where R is an aliphatic hydrocarbon group containing from 4 to 21 carbon atoms and $R_1$ is the hydrocarbon group of dimerized unsaturated fatty acids of 5 to 22 carbon atoms, and (3) a flow control and anti-caking agent in an amount of about 2 to 50% by weight, based on the weight of the epoxy resin and guanamine, which comprises (I) reacting the epoxy resin (1) with the quanamine (2) at a temperature in the range of about 100 to 210° C. in the presence of about 30 to 95% of the total amount of the flow control and anti-caking agent (3), (II) terminating the reaction when 5 to 95% complete by cooling the reaction product, and (III) blending the remainder of the flow control and anti-caking agent with the reaction product to provide the finely divided coating powder.

2. The process of claim 1 wherein the guanamine and epoxy resin are reacted in a ratio by weight of from about 5:95 to 75:25.

3. The process of claim 1 wherein the reaction of the epoxy resin and quanamine is terminated (II) when 15 to 50% complete.

4. The process of claim 1 wherein the finely divided coating powder has a particle size range of from about 50 to 200 microns.

5. The process of claim 1 wherein said flow control and anti-caking agent is selected from the group consisting of synthetic amorphous silicas and natural silicates.

6. The process of claim 5 wherein said flow control and anti-caking agent is a synthetic amorphous silica having an $SiO_2$ content of a least 98%, a pH of 6–8, a particle size of 3–5 microns, and a density of about 8.9 lbs./cu. ft.

7. The process of claim 1 wherein about 1 to 15% by weight, based on the weight of the guanamine, epoxy resin and flow control and anti-caking agent, of a material selected from the group consisting of heat resistant pigments and colorants is added to the finely divided coating powder after completion of the terminating step (II).

8. The process of claim 1 wherein the fatty guanamine has the formula:

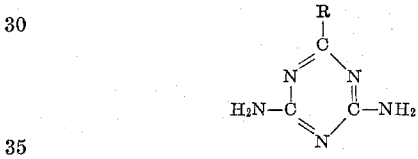

where R is an aliphatic hydrocarbon group containing 11 carbon atoms.

9. The process of claim 1 wherein the epoxy resin is a polyglycidyl ether of a polyhydric phenol.

10. The process of claim 1 wherein the epoxy resin reactant (1) is a mixture of a solid and a liquid epoxy resin.

11. The process of claim 10 wherein the solid and liquid epoxy resins are polyglycidyl ethers of a polyhydric phenol.

References Cited by the Examiner

UNITED STATES PATENTS

| | | | |
|---|---|---|---|
| 2,928,811 | 3/1960 | Belanger | 260—47 |
| 2,958,609 | 11/1960 | Stoll et al. | 260—37 |
| 3,028,251 | 4/1962 | Nagel | 117—21 |
| 3,102,043 | 8/1963 | Winthrop et al. | 260—37 |
| 3,102,823 | 9/1963 | Manasia et al. | 260—37 |

FOREIGN PATENTS 629,111   9/1949   Great Britain.

OTHER REFERENCES

Lee et al.: "Epoxy Resins," pages 52 and 53, McGraw-Hill Book Co., Inc., New York, 1957.

MORRIS LIEBMAN, *Primary Examiner.*

T. D. KERWIN, B. A. AMERNICK,
*Assistant Examiners.*